United States Patent [19]

ElDifrawi et al.

[11] 4,363,703

[45] Dec. 14, 1982

[54] THERMAL GRADIENT HUMIDIFICATION-DEHUMIDIFICATION DESALINATION SYSTEM

[75] Inventors: Ahmed A. ElDifrawi, Burr Ridge; Christopher F. Blazek, Palos Hills; Bernard D. Yudow, Chicago, all of Ill.

[73] Assignee: Institute of Gas Technology, Chicago, Ill.

[21] Appl. No.: 204,560

[22] Filed: Nov. 6, 1980

[51] Int. Cl.³ .............................................. C02F 1/14
[52] U.S. Cl. ...................................... 203/10; 203/22; 203/49; 203/89; 203/100; 203/DIG. 1; 159/1 SF; 202/172; 202/180; 202/233; 202/234; 202/236
[58] Field of Search .................. 203/DIG. 1, 49, 10, 203/11, 89, 22, 23, 100; 202/234, 233, 180, 172, 236; 159/1 S, 1 SF, DIG. 28

[56] References Cited

U.S. PATENT DOCUMENTS

| 610,790 | 9/1898 | Beckers | 417/85 |
|---|---|---|---|
| 875,042 | 12/1907 | Bissell | 60/398 |
| 926,408 | 6/1909 | Hall | 60/298 |
| 1,267,936 | 5/1918 | Tuch | 60/398 |
| 2,445,350 | 7/1948 | Ginnings | 202/234 |
| 2,820,744 | 1/1958 | Lighter | 202/234 |
| 2,843,536 | 7/1958 | Mount | 203/DIG. 1 |
| 3,015,613 | 1/1962 | Edmondson | 203/DIG. 1 |
| 3,088,882 | 5/1963 | Justice | 202/180 |
| 3,138,546 | 6/1964 | Muller | 202/234 |
| 3,168,450 | 2/1965 | Black | 203/DIG. 1 |
| 3,190,816 | 6/1965 | Ademac | 202/234 |
| 3,192,133 | 6/1965 | Ademac | 202/234 |
| 3,257,291 | 6/1966 | Gerber | 202/234 |
| 3,317,406 | 5/1967 | Beard | 202/180 |
| 3,334,026 | 8/1967 | Dobell | 202/180 |
| 3,928,145 | 12/1975 | Othmer | 203/11 |
| 3,986,936 | 10/1976 | Rush | 202/234 |
| 4,022,549 | 5/1977 | Gregg | 417/100 |
| 4,041,707 | 8/1977 | Spector | 60/614.14 |
| 4,053,368 | 10/1977 | Courvoisier et al. | 202/233 |
| 4,110,172 | 8/1978 | Spears, Jr. | 202/234 |
| 4,151,046 | 4/1979 | Eidelberg | 202/180 |
| 4,152,895 | 5/1979 | Wirt | 60/398 |
| 4,172,767 | 10/1979 | Sear | 202/182 |
| 4,186,311 | 2/1980 | Humiston | 290/1 R |
| 4,187,151 | 2/1980 | Hanning | 202/85 R |
| 4,210,494 | 7/1980 | Rhodes | 203/49 |

OTHER PUBLICATIONS

Hodges et al., "An Integrated System for Providing Power, Water and Food for Desert Coasts," 6(1) HortScience 10 (1971).

Primary Examiner—Wilbur L. Bascomb, Jr.
Attorney, Agent, or Firm—Allegretti, Newitt, Witcoff & McAndrews

[57] ABSTRACT

A solar energy desalination process utilizing solar radiation directly for the evaporation of salt water is described. Ambient air takes on water vapor as the air passes through an evaporative medium. It is then directed between a saline water-covered, solar absorbing surface and a solar collecting housing. The resulting heated and moisture-saturated air is cooled in a heat exchange means where condensation of fresh water occurs. Simultaneously, cool salt water is utilized as the cooling water in the heat exchange means, and takes on the heat of condensation given up by the condensing vapor. The heated salt water from the heat exchange means is partially directed over the solar absorbing surface, and at least a portion of it is also directed to wet the evaporative medium. Several optional sub-processes are described for operation of the system during periods of reduced insolation, and an alternative process is described for operation of the process on a floating platform.

30 Claims, 6 Drawing Figures

Fig. 6

THERMAL GRADIENT HUMIDIFICATION-DEHUMIDIFICATION DESALINATION SYSTEM

BACKGROUND OF THE INVENTION

This invention relates to the field of purification of salt water by the humidification of air with that water, followed by dehumidification of the air to produce fresh water. The invention is especially useful for the continuous desalination of seawater in locales where the temperature of the ocean drops sharply with increasing depth.

Man's requirements for water are becoming increasingly evident as the earth's population increases, agricultural needs grow, and industries expand. Fresh water represents less than 3% of the water on earth. Of this 3%, nearly 75% is "trapped" as ice throughout the world, but predominantly at the polar ice caps. The remaining 97% of the earth's water is in the form of salt water or brackish water. The quest for fresh water has turned to desalination technology to convert the great oceans and vast inland brackish water reserves to fresh water.

Fresh water is obtained from salt water by separating the fresh water from an ever increasing concentration of salt water or by separating the salt from an ever increasing fresh water solution. Some of the processes which have been employed to accomplish this include simple evaporation, distillation, multieffect evaporation, multistage flash evaporation, thin film distillation, reverse osmosis, freeze crystallization, ionic separation and electrodialysis. Most of the existing desalination plants which employ these processes use fossil fuel as the energy source.

Solar distillation, which is an evaporation/condensation process, is based on the absorption of the sun's radiant heat on the dark coated bottoms of shallow trays filled with seawater (or brackish water). The water vapor which is formed is subsequently condensed on the cooler undersurface of transparent material located immediately above the pan. Convective cooling of the transparent cover by the atmosphere removes the heat of condensation. The transparent collector cover is sloped to allow the condensate to run off into collecting troughs at the base of the collector.

A variation on the solar still is illustrated in Hodges et al., "An Integrated System for Providing Power, Water and Food for Desert Coasts," 6(1) HortScience 10 (1971). In this system, a single stream of hot seawater is sprayed down through a packed tower countercurrent to a rapidly rising stream of air. This fills the air with a salt-free vapor which moves up through a duct into a second, condenser tower. Seawater enters the cycle at the bottom of the condenser and is pumped up within the tubes of a heat exchanger. Vapor forced over from the evaporator forms on the tubing as fresh water condensate and rains down to the base, where it is collected. The seawater spiralling up through the condenser and heated by the latent heat of vaporization is then conducted to a seawater heater, out of contact with the air stream, before entering the evaporator tower. The heat source for seawater heating is described as heat from a solar collector or waste heat from generators.

U.S. Pat. No. 4,172,767 to Sear describes a modified solar still which makes use of the difference in temperature between water on the surface of the sea and water at some greater depth. Seawater is collected in a tank and evaporated with the aid of accumulated rays from the sun. A blower forces the moisture-laden air above the heated seawater through a pipe into the depth of the sea. Moisture is condensed as the heat of condensation of the vapor in the air is dissipated in the seawater, and the potable water is then pumped up to the surface. Other patents relating to the use of ocean thermal gradients to produce potable water by condensation of water from a vapor-laden air stream include U.S. Pat. Nos. 4,186,311; 3,928,145; 4,151,046; 3,986,936; 2,820,744; 4,110,172; 4,187,151 and 3,257,291. U.S. Pat. No. 4,041,707 discusses cooling of warm surface air by passing it below the ocean surface, but does not suggest use of a moisture recovery system. Publications which pertain to compression of air using wave power or to related technology include U.S. Pat. Nos. 610,790; 875,042; 926,408; 1,267,936; 4,022,549 and 4,152,895.

Many of the processes currently employed for desalination are burdened with expensive requirements for mechanical equipment or energy from external sources. Evaporative desalination is characterized by high thermal energy consumption. While this consumption may be reduced by employing a multiple-effect concept, the number of effects employed in a particular operation is then determined by the trade-off of additional heat exchanger costs versus energy cost. In a vapor compression-evaporation process, approximately four-fifths of the energy requirement is for mechanical compression, and the remainder is for boiling water circulation. In the electrodialysis process, electrical requirements are proportional to the salt concentration of the water being purified, so the process is generally used only for desalting of brackish water. Separation of salt from saline water via an ion exchange resin is generally limited to small scale desalination projects since the chemicals required to regenerate the resins would become prohibitively expensive in large scale application.

No reference in the prior art envisions the combination of energy recycle and low operating energy requirements which characterize the inventive process.

SUMMARY OF THE INVENTION

The instant invention comprises an apparatus and process for the evaporative purification of salt water and other impure water to provide fresh water. The system provides for the production of fresh water by a unique means such that the energy efficiency of the process is especially high and the corresponding cost per gallon of fresh water advantageously low. All raw materials for the process are available on site, the system has low power requirements and is simple to operate. The apparatus and process of the invention are useful for the purification of salt water, brine, brackish water, and other impure water which is capable of purification by traditional evaporation-condensation processes. The term "salt water" as used throughout the specification and claims hereof is thus intended to encompass salt water, including seawater, brine, brackish water, and other impure water which is capable of purification by traditional evaporation-condensation processes.

The inventive apparatus is an apparatus for the evaporative desalination of salt water to provide fresh water comprising:

heat exchange means having a liquid-receiving section with entrance and exit ports and a vapor-receiving section for passing cold salt water contained in the liquid receiving section into heat exchange contact with a flow of moisture laden comparatively warm air contained in the vapor receiving section so that fresh water may be condensed from the moisture laden comparatively warm air and the heat of condensation of that fresh water transferred to the comparatively cold salt water, the temperature of which will become comparatively warm;

means, communicating with the exit port of the liquid-receiving section of the heat exchange means, for at least partially segregating the flow of salt water of comparatively moderate temperature into at least a first and second stream;

means, having air inlet and air outlet ports, for contacting the first stream of the salt water of comparatively warm temperature with the flow of moist air which is subsequently passed into heat exchange relationship with the comparatively cold salt water and means for simultaneously segregating from the atmosphere and heating by solar means both the salt water of comparatively warm temperature and the flow of moist air, to cause evaporation of water into the air so that it becomes moisture laden;

an evaporative medium positioned prior to the air inlet of the means for contacting the first stream of the salt water of comparatively warm temperature with the flow of moist air, so that ambient air may be passed through the evaporative medium to absorb moisture and become the flow of moist air which is contacted with the stream of salt water while both are heated by solar means; and means for conveying at least a portion, and preferably all, of the salt water of comparatively warm temperature into contact with the evaporative medium in order to wet the medium.

More specifically, the apparatus preferably comprises, first, heat exchange means having a liquid-receiving section and a vapor-receiving section for passing cold salt water into heat exchange contact with a flow of moisture laden comparatively warm air. Fresh water may thus be condensed from the moisture laden comparatively warm air as the heat of condensation of the water vapor which becomes fresh water is transferred to the comparatively cold salt water, the temperature of which becomes comparatively warm.

The liquid receiving section communicates with at least two conduits, each of which is designed to receive a portion of the flow of salt water of comparatively warm temperature. The first such conduit further comprises sides and a base having a solar absorptive surface over which the water flows, but is open at its top to a chamber intended to contain moist air and to contact this air with the upper surface of the salt water of comparatively warm temperature which flows through the conduit. (The moist air is subsequently passed into heat exchange relationship with the comparatively cold salt water.) The conduit and chamber are housed within a solar collector housing so that the water and air may be simultaneously heated, and water evaporated into the air to make it moisture laden.

The second conduit and exit of the first conduit communicate with an evaporative medium positioned at the ambient air inlet to the vapor-containing chamber. The evaporative medium may thus be constantly or continuously wetted with salt water of comparatively warm temperature, and means are provided to force ambient air through the evaporative medium where it will pick up moisture before entry into the chamber.

The inventive process is a process for the evaporative purification of salt water to provide fresh water comprising, first, passing comparatively cold salt water into heat exchange contact with a flow of moisture laden comparatively warm air so that fresh water is condensed from the moisture laden comparatively warm air and the heat of condensation of that water vapor (which becomes fresh water) is transferred to the comparatively cold salt water, the temperature of which becomes comparatively warm. The flow of salt water of comparatively warm temperature is then at least partially segregated into at least two streams. One such stream is contacted with the flow of moist air which is subsequently passed into heat exchange relationship with the comparatively cold salt water, and both this salt water of comparatively warm temperature and the flow of moist air are simultaneously heated by solar means to cause evaporation of water into the air so that it becomes moisture laden. An evaporative medium is wetted with at least a portion of the salt water of comparatively warm temperature, and ambient air is passed through the wetted evaporative medium so that the air absorbs moisture and becomes the flow of moist air which is contacted with the first stream of salt water while both are heated by solar means. Operation of the inventive system is preferably continuous.

Alternatively, the inventive apparatus and process may include modifications permitting operation of the system on a floating platform.

In its preferred form, the inventive apparatus further comprises a warm brine collection means for storage of the warm salt water exiting the process, and the process further comprises a sub-process for recycling this warm water through the system to produce additional fresh water at night or on cloudy days when solar heating is not available. The apparatus and process are preferably applied to the desalination of seawater or brackish water.

In its most preferred form, the apparatus and process are modular, within a system of repeating units as described above. Since the performance of each module is substantially independent of the other modules, servicing and maintenance operations may be carried out without shutting down the entire system. Design around a standard module size also allows a wide range of production capacities, ranging, for example, from 10 to over 10,000 tons of fresh water per day. Assembly of a desalination plant is simplified by the modular approach, since modules or parts of modules can be fabricated at a remote site, brought in to the assembly site, and assembled with a minimum of skilled local labor.

The power requirements for parasitic pumps and blowers for the process are comparatively low, and are preferably supplied by a photovoltaic array/battery storage system. By using manifolds for air and water distribution in the design, a minimum number of pumps and blowers is required, thus simplifying the mechanical systems. This is a significant advantage in many applications of the invention, because skilled labor is often difficult to obtain in exactly those locales where demand for such a desalination system is greatest.

DESCRIPTION OF THE PREFERRED EMBODIMENTS

Figure 1:
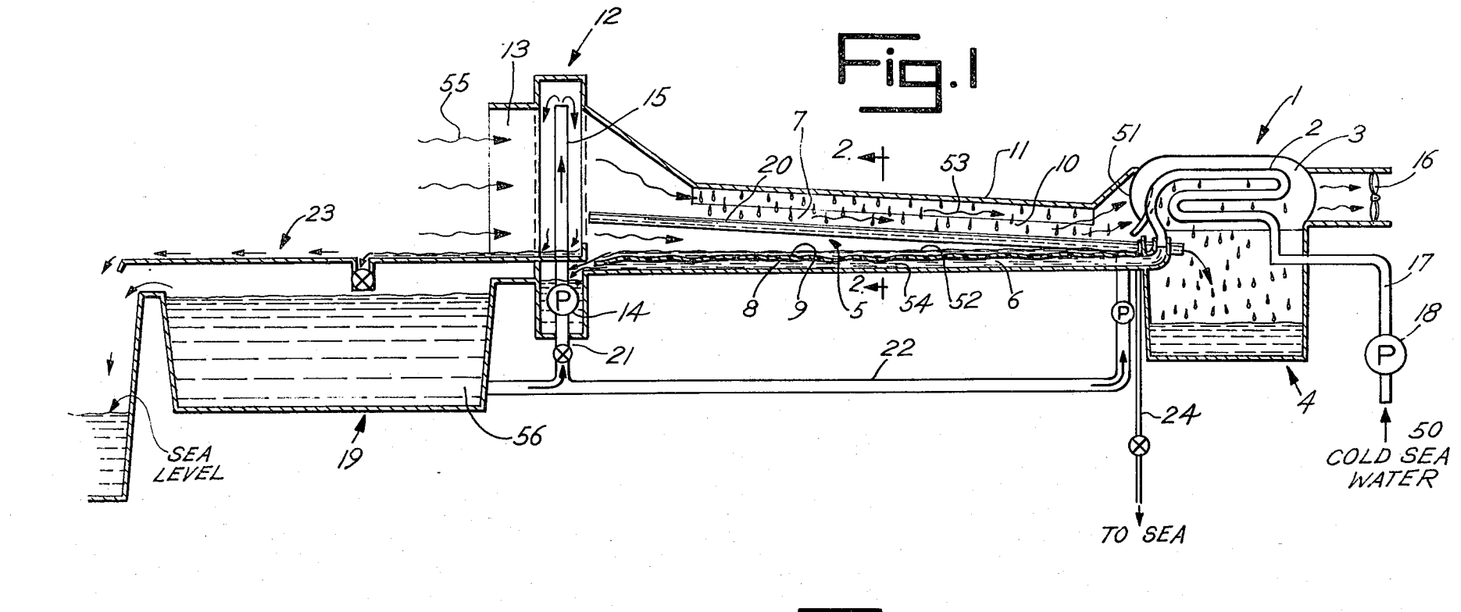
FIG. 1 is a cross-sectional side view of the apparatus of this invention.

Referring to FIG. 1, the apparatus of the invention comprises heat exchange means 1 having a liquid-receiving section 2 and a vapor-receiving section 3 for passing cold salt water contained in the liquid receiving section 2 into heat exchange contact with a flow of moisture laden comparatively warm air contained in the vapor receiving section 3 so that fresh water may be condensed from the moisture laden comparatively warm air. In the figure, the fresh water drips down and is collected in a fresh water storage means 4. The heat of condensation of the condensing water is transferred to the comparatively cold salt water, the temperature of which thus becomes comparatively warm.

The liquid receiving section 2 of heat exchange means 1 communicates with at least two conduits 5, 6 each of which is designed to receive a portion of the flow of salt water of comparatively warm temperature. The first such conduit 5 further comprises sides 7 and a base 8 having an absorptive surface 9 over which the salt water of comparatively moderate temperature flows. The conduit 5 preferably communicates at its other extreme with an evaporative medium 12. This conduit 5 is open at its top to a chamber 10 through which moist air flows in contact with the upper surface of the salt water of comparatively warm temperature flowing through conduit 5. (The moist air is subsequently passed into heat exchange relationship with the comparatively cold salt water.) The conduit 5 and chamber 10 are housed within a solar collector housing 11, preferably comprising a transparent cover or glazing, so that the water and air may be simultaneously heated by solar means, and water evaporated into the air to make it moisture laden. The conduit 5, chamber 10 and solar collector housing 11 are collectively referred to as the evaporator section of the inventive apparatus.

The second conduit 6 which communicates with the liquid receiving section 2 of heat exchange means 1 communicates at its other extreme with an evaporative medium or evaporative pad 12, which additionally functions as a heat exchange means. The evaporative medium 12 is positioned at the ambient air inlet 13 to the vapor-containing chamber 10. The evaporative medium 12 is continuously wetted by the comparatively warm salt water from conduits 5 and 6, so that salting out on the medium does not occur. One apparatus for accomplishing this wetting is illustrated in the figure, with pump 14 designed to pump salt water of comparatively warm temperature through conduit 15 to the top of the evaporative medium 12, through which the water descends. Means are provided to force ambient air through the evaporative medium 12 where it will pick up moisture and thermal energy before entry into the chamber 10. In the figure, this means is in the form of a fan or blower 16 positioned at the air outlet of the vapor receiving station 3 of heat exchange means 1.

Figure 4:
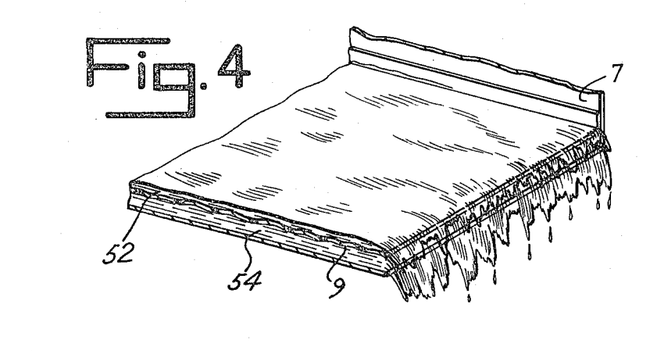
FIGS. 4 and 5 are perspective views of alternative floating solar adsorptive surfaces either completely (FIG. 4) or partially (FIG. 5) segregating the streams of comparatively warm water from each other.
Figure 5:
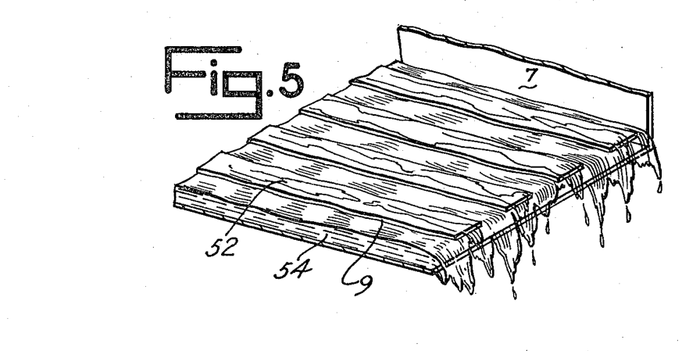

Alternative means for either completely or partially segregating the streams of comparatively warm salt water are contemplated. The function of the segregating means is to limit the mass of water on which the solar energy impinges so that the energy is imparted only to that mass which is required to humidify the air, and not largely wasted in heating other water. Referring to FIG. 4, instead of employing rigid conduits to segregate the streams, for example, a solar absorbing surface 9 essentially floating on the bulk of the comparatively warm water 54 and with a thin film of water 52 on its upper surface, may be utilized. The solar absorbing means 9 need not be continuous, and may only partially or intermittently segregate the water to be evaporated from the bulk of the warm water stream. One means for accomplishing this is illustrated in FIG. 5, i.e., floating discontinuous strips of solar absorbing material 9. It is also contemplated that the configuration of the solar absorbing surface 9 may be other than flat.

When the apparatus is applied, as is preferable, to the desalination of seawater or brackish water, the cold water to be desalinated will enter the system through conduit 17, which communicates with the liquid receiving section 2 of heat exchange means 1, and will be forced through the system by conventional pump means, illustrated in the figure as a single pump at 18.

The process of the invention may be described as follows.

Comparatively cold salt water 50 is passed into heat exchange contact with a flow of moisture laden comparatively warm air 51 so that fresh water is condensed from the moisture laden comparatively warm air and the heat of condensation given up upon formation of that fresh water is transferred insofar as practicable to the comparatively cold salt water the temperature of which becomes comparatively warm. The transfer of the heat of condensation from the condensing vapor to the salt water is not complete, because of the limitations inherent in commercially available heat exchangers, but is substantial. The recycle of this heat within the process provides a significant advantage in terms of increased fresh water production for the same input of energy from external sources.

The flow of salt water of comparatively warm temperature is then at least partially segregated into at least two streams. One such stream 52 is contacted with the flow of moist air 53 which is subsequently passed into heat exchange relationship with the comparatively cold salt water, and both the salt water of comparatively warm temperature and the flow of moist air are simultaneously heated by solar means to cause evaporation of water into the air so that it becomes moisture laden. This contacting is preferably countercurrent, since the evaporation rate is proportional to temperature differentials between the air and water streams and to the relative velocity of the air with respect to the water. The optimum length of conduit 5 is determined by the cost of additional length vs additional fresh water produced.

An evaporative medium 12 is continuously wetted with at least a portion and preferably all of the salt water of comparatively warm temperature 52 and 54, and ambient air 55 is passed through the wetted evaporative medium 12 so that the air absorbs moisture and becomes the flow of moist air 53 which is contacted with the first stream of salt water 52 while both are heated by solar means. The preferred ratio of salt water directed through conduit 6 versus salt water directed through conduit 5 is about 5:1. By passing only a portion, rather than all, the salt water from the heat exchange means 1 into conduit 5, the water that does enter this conduit is heated more quickly, since the same solar input is impinging on a smaller mass of water.

In a preferred embodiment of the invention, illustrated with reference to the FIG. 1, ambient air 55 is drawn from the atmosphere by a blower 16 into an evaporative/heat exchange medium 12. A pump 14 is used to draw seawater 54 of comparatively warm temperature from conduits 5 and 6 through the riser pipe 15 into the evaporative/heat exchange medium 12. The evaporative pad warms and humidifies the air as it is drawn into the chamber or tunnel 10. The evaporation chamber 10 is enclosed by a transparent glazing 11 as its housing on the top and a solar absorption/evaporation surface 9, preferably black in color, on the bottom 8. The glazing may be either a non-concentrating or concentrating cover. In the case of a concentrating glazing, the solar absorption/evaporation surface 9 must be sized such that it does not exceed the solar concentrated radiation area at the absorber level. A thin film of warm seawater 52 from the condenser or heat exchange means 1 is introduced into conduit 5 and flows above the absorption/evaporation surface 9. As the seawater 52 travels down the conduit 5 open at its top to chamber 10, it is heated and partially evaporated by direct solar radiation. The now-saturated hot air 51 enters the condenser or heat exchange means 1 and is drawn through. The cooling water 50 for the condenser or heat exchange means 1 is pumped from an offshore subsea location. This indirect "solar energy" heating of the water and air is important in both equipment cost and energy savings.

The fresh water which is condensed in the condenser or heat exchange means 1 is collected in a fresh water storage reservoir or means 4. The processed brine overflows into a warm brine collection means 19. Overflow from the warm brine collection means or pond may be directed back into the sea or brackish water source. The warm brine 56 may be used at night to evaporate more water to augment daytime fresh water production. This results in excellent second law thermodynamic efficiency because successive moisture removal is achieved as the temperature of the water is degraded.

As a result of the solar-assisted operation of the system, two sources of preheated salt water will be available for preparation of additional fresh water during periods of reduced insolation, i.e., at night or on cloudy days. All references to nighttime operation herein are equally applicable to operation on cloudy days. One source is the hold-up of salt water 52 of comparatively moderate temperature in the evaporator conduit itself; the second is the accumulation from solar-assisted operation of water discharged from the process into warm brine collection means 19. When sunlight is not available, three options are available to take advantage of the energy retained in these two reservoirs of warm water.

Figure 2:
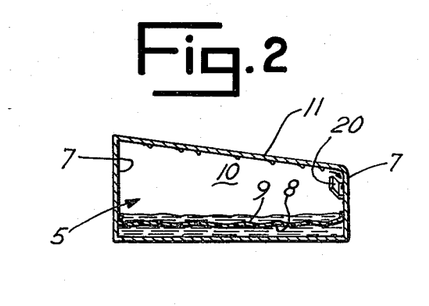
FIG. 2 is a cross-sectional end view taken at 2—2 of the apparatus of this invention.

Referring to FIGS. 1 and 2, the first and second options make use of the housing 11, which is cooled by nighttime air and radiative cooling to the night sky, as a condensing surface. In the first option, the sensible heat of the salt water 52 contained in the conduit 5 generates vapor which will humidify the air and condense on the underside of the cold housing surface 11. This condensed water will run down the sloped, preferably glass surface of the housing 11 and accumulate in a drain 20 provided along the inside lower edge of the housing 11.

The drain 20 communicates with the fresh water storage means 4 into which the fresh water flows.

In the second option, water 56 in the brine collection means 19 is permitted to circulate through conduit 21 and over the evaporative medium 12 while nighttime air 55 is drawn through the medium 12. This air then passes over the salt water of comparatively moderate temperature retained in the first conduit 5. The sensible cooling of these two brine sources provides the energy required to vaporize the water. Condensed water will once again run down the sloped surface of the housing 11 and accumulate in the drain 20 which communicates with the fresh water storage means 4.

In the third alternative for nighttime operation, warm brine 56 from the brine collection means 19 is circulated over the evaporative pad 12 and is also recycled into conduit 5 via conduit 22. Implementation of this third alternative may or may not be desirable depending on temperature of the recycled water. Condensation may be effected on the glazing alone, or by operation of the heat exchange means 1. Warm air, saturated with water vapor, would be pulled through the heat exchange means 1 by the exhaust fan 16, and the brine would be discharged to the sea via conduit 23, by passing, as a result of closure of a valve, the brine collection means 19. The fan and pumps would operate at reduced output. The cold seawater circulated through the heat exchange means 1, depending on relative temperatures, may be discharged immediately to the sea through conduit 24 or may be combined with the warm brine entering conduit 5.

Figure 3:
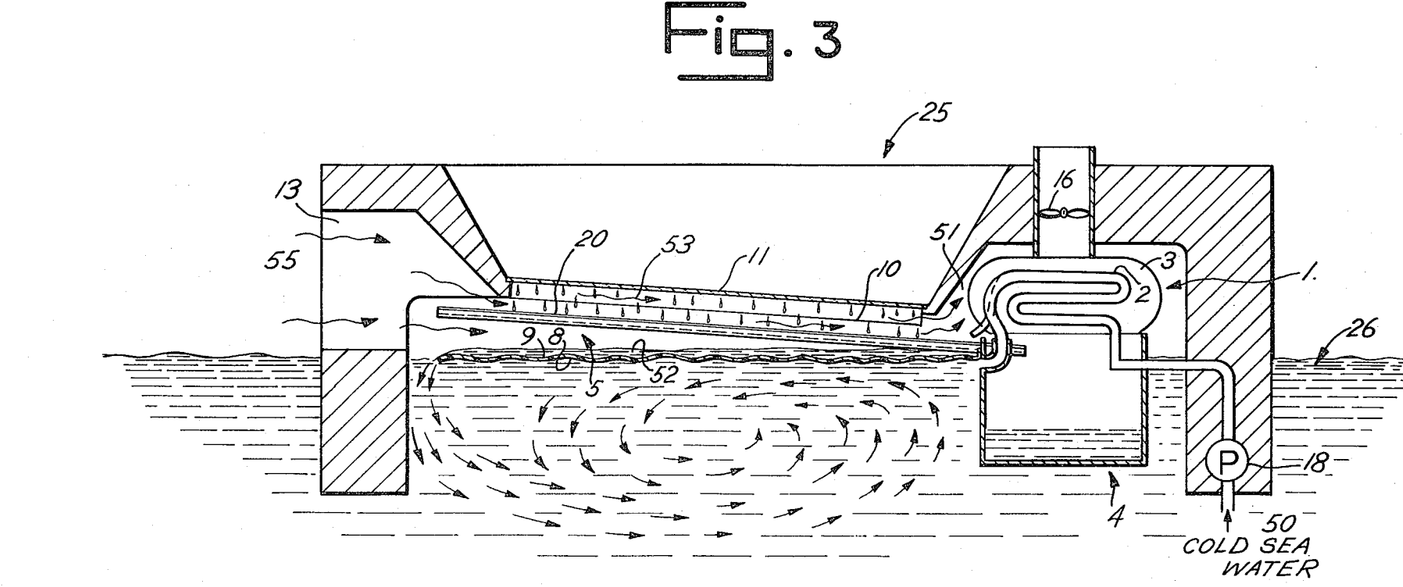
FIG. 3 is a cross-sectional side view of the alternative embodiment of the apparatus of this invention in which the system is housed on a floating platform.

As a further alternative illustrated in FIG. 3, the apparatus and process may be located on a conventional floating platform 25, floating on the surface of the salt water 26. This embodiment parallels the embodiments of the invention as operated on land with two significant differences. First, since the air on the surface of the salt water should already be largely saturated with moisture under ambient conditions, the evaporative medium may not be required. Secondly, the salt water of comparatively warm temperature exiting the heat exchange means 1 which does not pass over the solar absorbing surface 9 is commingled with the seawater on which the surface 9 rests or floats, as is the remainder of the salt water of comparatively warm temperature after it has passed over the solar absorbing surface. Convection currents operate to keep the warmest seawater in the locale immediately under the absorbing surface 9.

Several embodiments of the inventive apparatus and process will be illustrated through the example of a seawater desalination plant located on the seashore in a desert locale. Typical values of various operating parameters for a single modular section during daytime performance are set forth in Table I.

TABLE I

| | |
|---|---|
| Dew Point (D.P.) of Inlet Air | 32° C. |
| Length of First Conduit (Evaporator Section) | 200 m |
| Width of First Conduit (Evaporator Section) | 0.6 m |
| Height of First Conduit (Evaporator Section) | 0.3 m |
| Average Daily Insolation | 5 kWh/m$^2$ |
| Average Solar hour/day | 8 h |
| Average Insolation/hr kWh/m$^2$ | 0.625 |
| Density of Dry Air at 30° C. | 1.169 kg/m$^3$ |
| Depth of First Conduit | .06 m |
| Daily Average Solar Collection Efficiency (heat used in process/total solar radiation at surface of module | |

TABLE I-continued

| | |
|---|---|
| glazing) | $(n_c) = .65$ |
| Specific Heat of Air,<br>$C(a) = [.2385 + w (.48)]$<br>$w$ = water content in air | $1.16 \times 10^{-3} \frac{kWh}{kg\ °C}$ |
| Specific Heat of Water, C(s) | $1.167 \times 10^{-3} \frac{kWh}{kg\ °C}$ |
| Density of Seawater, D(s) | 1.025 kg/l |
| Air Flow Rate, F(a) | $1200 \frac{m^3}{h}$ |
| Mass Flow Rate of air, m(a) | $1402.8 \frac{kg}{h}$ |
| Specific Heat of Fresh Water C(w) | $1.16 \times 10^{-3} \frac{kWh}{kg\ °C}$ |
| Average Ambient Air Temperature During Solar Hours (yearly basis) | 35° C. |
| Average Nighttime Ambient Temperature | 20° C. |
| Average Daytime Dew Point (D.P.) at | 32° C. |
| Average Nighttime Dew Point (D.P.) at | 18° C. |
| Temperature of Cold Seawater | 22° C. |

Ambient air enters the system and passes through an evaporative pad in which the seawater of comparatively warm temperature gives up heat and water vapor to the air. This step takes advantage of the heat remaining in the brine and provides warm, saturated air at the exit of the evaporative pad. The spent brine, at 39° C., is directed to the warm brine pond where it can be reused to generate fresh water during nighttime operation.

At the point where the air exits the evaporative pad and enters the chamber above the solar evaporative pond, the dry bulb temperature is 42.2° C., the dew point is 42.2° C., the enthalpy of the air is $5.65 \times 10^{-2}$ kWh/kg and the energy flow rate associated with the air flow is 79.26 kWh/hr.

Solar insolation passes through the cover glazing of the solar evaporative pond where some of it is absorbed. The remaining solar radiation is absorbed by the dark-colored channel (solar absorption surface) over which the seawater passes. The seawater picks up heat from the dark-colored channel and its temperature rises. From the point where the air enters the evaporation chamber, the saturated air traverses the length of the solar evaporative pond picking up heat and humidity from the solar heated water above the absorbers. It gains heat from the seawater through convective heat transfer. (Some heat is lost from the air to the cover glazing through similar convective heat transfer mechanisms.) The seawater cools while it supplies the latent heat of vaporization for the water vapor added to the air stream.

The interplay of combined heat and mass transfer from the solar input results in a warm, nearly saturated air stream at the exit from the solar evaporative pond. At this point, the dry bulb temperature of the air is 55° C., the dew point of the air is 52° C., the enthalpy of the air is $9.10 \times 10^{-2}$ kWh/kg, and the energy flow rate associated with the air flow is 127.7 kWh/hr.

From this point, the warm, humidified air is directed past the condenser cooled by cold seawater where a substantial amount of the water contained in the air stream is recovered in the form of fresh water. The fresh water produced in the condenser drains to a fresh water holding tank for later use. At the exit from the condenser, the dry bulb temperature of the air is 25° C., the dew point of the air is 25° C., the enthalpy of the air is $26.3 \times 10^{-3}$ kWh/kg, and the energy flow rate associated with the air flow is 36.9 kWh/hr. At the inlet for cold seawater to the condenser, the flow rate of the seawater is 2612.3 kg/h at a temperature of 22° C. The exit temperature of the seawater from the condenser is 52° C. This warmed seawater travels the length of the module toward the air inlet gaining solar energy.

The heat gain of the seawater passing through the condenser is equal to the reduction in enthalpy of the air passing through the condenser. The heat removed in the condenser shows up primarily as the latent heat of vaporization of the water vapor into the air stream, plus a change in the sensible heat content of the air stream. Thus, in the condenser, 91.2 kWh/hr of energy is moved from the air stream and transferred to the seawater. This results in a fresh water production rate of 109.4 kg/h, or 875.2 kg per eight hour day per module. Nighttime production easily provides an additional 125 kg/day for a total of 1000 kg fresh water per day per module.

As a result of the daytime operation, there will be, as indicated above, two preheated volumes of seawater. One is the hold-up of salt water of comparatively warm temperature maintained in the evaporator channel itself which amounts to 7380 kg at a temperature of about 52° C. A second amount is the accumulation from the daytime operation that is held in a warm brine pond. This is equal to 19,884 kg, but at a temperature of 39° C.

Employing the first (completely passive) option for nighttime operation, the sub-process is tantamount to a conventional solar still. Values reported on such operation indicate that over a 14 hour period, a production of approximately 1.7 kg/m² can be expected. With a total area of 120 m², over the same 14 hour period, 200 kg will be produced.

The second option takes advantage of the availability of the active componentry necessary for daytime operation. In this case, the water in the storage pond (39° C.) will be allowed to circulate over the evaporator pad while nighttime air is drawn through the pad. This air then passes over the evaporator pond (52°). The sensible cooling of these two brine sources provides the energy required to vaporize the water that is transferred into the cooler night air with a dew point of about 18° C. This air, saturated with water vapor is directed over the condenser by the exhaust blowers and the brine is discharged to the sea. As a result, about 650 kg of product water would be produced during 14 hours of nighttime operation.

Values for energy use by the desalination system are presented for a solar input of 3.25 kWh/m²/day and parasitic blower and pump electrical loads of $7.23 \times 10^{-2}$ kWh (electric) per square meter per day (at 0.5 kW for eight hour daytime production and 0.33 kW for fourteen hour nighttime production from the 120 square meter desalination system). Performance of the desalination system is summarized in Table II.

TABLE II

SUMMARY OF DAILY PERFORMANCE OF DESALINATION SYSTEM

| | OPTIONS FOR NIGHTTIME OPERATION | |
|---|---|---|
| | OPTION I<br>PASSIVE<br>SYSTEM | OPTION II<br>PARTIALLY<br>ACTIVE SYSTEM |
| Daytime fresh water production | 7.29 kg/m² | 7.29 kg/m² |

TABLE II-continued

SUMMARY OF DAILY PERFORMANCE OF DESALINATION SYSTEM

| | OPTIONS FOR NIGHTTIME OPERATION | |
|---|---|---|
| | OPTION I PASSIVE SYSTEM | OPTION II PARTIALLY ACTIVE SYSTEM |
| Nighttime fresh water production | 2.00 kg/m² | 5.00 kg/m² |
| Total fresh water production | 9.29 kg/m² | 12.29 kg/m² |
| Parasitic Electrical energy requirements | 1.3 kWh/m³ | 2.8 kWh/m³ |

Total daily fresh water production is 12.29 kg/m²/day using option II and 9.29 kg/m²/day for option I. For the 120 square meter module of this example, daily fresh water production ranges from 1475 kg/day to 1114.8 kg/day. Solar energy requirements range from 0.27 kWh/g for option II to 0.36 kWh/kg for option I. Parasitic electrical energy requirements supplied by the photovoltaic array with battery storage are quite low because blower and pumping loads are quite modest. Parasitic electrical energy requirements range from only $1.3 \times 10^{-3}$ kWh/kg for option I to $2.8 \times 10^{-3}$ kWh/kg for option II.

Although option II indicates greater power consumption per cubic meter of product water, it must be noted that the fresh water produced is 32% greater. This could be reflected in a smaller plant size.

The relatively low power requirements on the order of 1.3 to 2.8 kWh/m³ of fresh water produced for operation of the pumps and blowers is preferably met by photovoltaic cell generation of electricity. Other alternatives, which may be used individually or in combination, include operation of a Rankine cycle based on the difference between the temperature of the surface salt water and the temperature of the water at some depth, concentration of solar energy on a boiler to produce steam which powers a turbine and generator, gravity return of the reject brine to the salt water source serving to operate a hydropower turbine, wind power, wave power, osmotic power, or hydropower generated by the level differential between a pond filled at high tide and the level of seawater at low tide. Electrical storage batteries may be employed to provide the power requirement for nighttime operation and to restart the equipment during the day. For infrequent occasions of inclement weather when several starts are required before the batteries can be recharged, make-up power may be provided by combustion engine driven motor generator sets or by purchased electric utility power.

Figure 6:
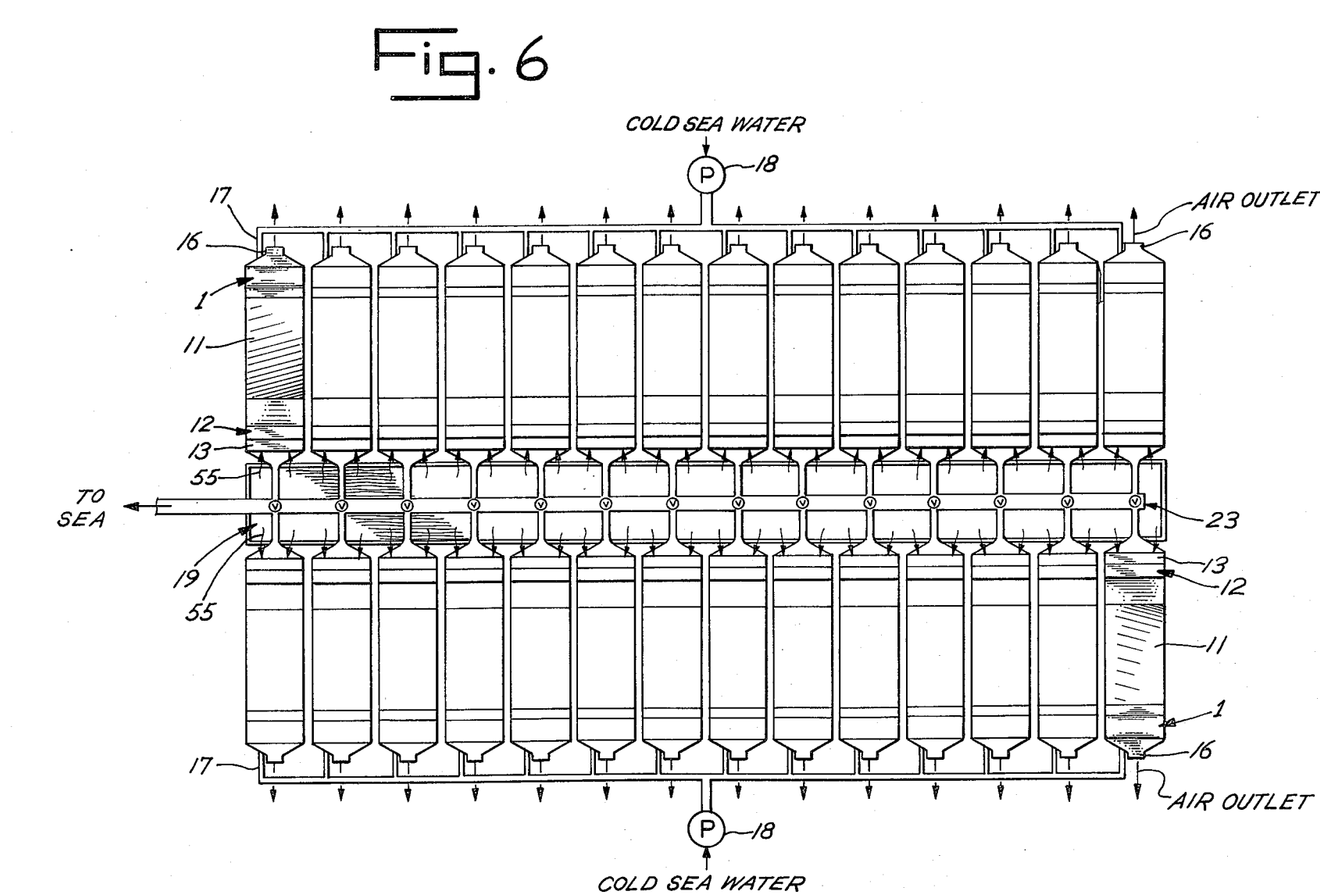
FIG. 6 is a plan view of a number of modules of an apparatus as in FIG. 1 assembled in a desalination plant.

While the details of the inventive apparatus and process may be varied within the general inventive concept, specifics of the preferred mode of operation will now be described, assuming six thousand modules associated in a single desalination plant. A number of modules associated in a single desalination plant are illustrated in FIG. 6, wherein reference numerals and the elements to which they refer correspond to like numerals and elements in FIG. 1.

The modularized components include:
Evaporative Pad
Pumps for Evaporative Pad
Evaporator Section
Condensers
Fans
Fresh Water Storage
Mechanical Tube Cleaning System Items which more economically service the system in larger units include:
Cold Water Pipe
Cold Water Pump
Control Room
Operations Building
Product Water Pump It appears that the inventive process requires less power than existing desalination systems. Total power requirements are only in the range of 1.3 kW-hr per cubic meter of product water. However, the process is very sensitive to systems pressure drop. Large hourly flows of air ($8.4 \times 10^6$ kg) and water ($1515 \times 10^6$ kg) cause large increases in power consumption for even minor rises in pressure drop. A practical objective for power requirements is 1.0 MW distributed as follows:

| | Power Consumption | Pressure Drop |
|---|---|---|
| Fans | 230 kW | 7.6 mm water |
| Pumps | 420 kW | 5.2 m water |
| Other | 350 kW | — |
| Total | 1000 kW | |

Another unique characteristic of the inventive process is the relative simplicity of its major fluid systems. Air systems may have no controls or valves. Flow is fixed by the relatively low resistances through the evaporative pads, evaporator sections, and condensers.

The main water system also operates with a minimum number of controls or control valves. The cold water pump provides sufficient head to force the water through the condensers. The water flows through the solar pond and back to the sea by gravity.

PUMPS AND SCREENS

Cold Water Pumps

The cold water pumps are located in the basement of the cold water pump house near the shore. Vertical pumps are used with their barrels located below the low tide level to preclude a need for priming. To minimize friction drop and pressure losses, the system has no valves. Velocity is held below 1.2 m/sec, and isolation of the individual modules when required is with a simple flange blind. The pump discharge head is determined in part by the elevation of the inventive apparatus above sea level. Total head is in the range of 8–12 meters. This allows low speed and promotes long impeller and bearing life. For purposes of water power consumption calculation, it is assumed that the elevation of ponds is 1.5 m above sea level.

Three 50 percent capacity pumps are provided so that 100 percent output can be maintained when any one pump is down for repairs.

A trash screen is located on the end of the cold water pipe. Fine cleaning is done on shore using a sand bed type filter, traveling screen or other type cleaner.

Pumps for the Evaporative Pad (Evaporator Pumps)

Evaporator pumps are provided for each of the modules to pump water from the solar ponds over an air-water contacting evaporative medium. Pump head is low (2.5–3.0 meters) and flow is approximately $2.6 \times 10^5$ kg/hr. Because the contacting medium requires flow through small passages, it is necessary to strain the water at the pump suction. Redundant or self-cleaning screens are necessary to assure continuous operation without plugging.

The pumps operate at low speed and with materials of construction selected to resist seawater corrosion. Twenty-year life with minimum maintance should be readily achieved.

Fans

Fan operation is second only to water pumping in consumption of power. Sixty fans are provided each with a capacity of approximately 2,440 cu m per minute at approximately 50 mm water column and each requiring a 30 kW motor. The objective is to obtain a pressure drop distribution as follows:

| | |
|---|---|
| Evaporator | 1.40 |
| Entrainment Separator | 1.25 |
| Pond Friction | 2.50 |
| Condenser | 2.50 |
| TOTAL | 7.65 mm |

Fans handle humid coastal air and are subject to nighttime dew point condensation and to airborne salt from winds over the sea. Conditions are mildly corrosive and carbon steel construction coated with an organic polymer should provide 20-year life.

Cold Water Pipe and Warm Water Discharge

The cold water pipe, 2.25 m in diameter, supported on the bottom and anchored against local current, is run from the coldest available point to the desalination plant located on shore. At the velocity of the cold water flowing in this size pipe, heating from the warm outside water near the surface and from the buried section of the pipe on land has only a small warming effect on the water. On shore, the 2.25 m cold water pipe is buried and run into a manifold for distribution to the modules.

The intake of the cold water pipe is located at a sufficient distance above the sea bottom to preclude entry of agitated mud and sand. A screen located over the opening prevents entry of fish and sea plants.

Warm discharge water from the inventive apparatus is returned to the sea in an open trench. Concentration and temperature of the discharged brine depend on the option choosed for the night time desalination process and the ambient conditions. The increase in salt water salinity would be in the range of 3% to 5%.

Materials of construction for optimal life and cost include steel, concrete, concrete lined steel, polyethylene pipe, fiberglass reinforced plastic pipe and plastic pipe liners.

Evaporative Pad

The evaporative pad serves to recover heat from the warm seawater before it is discharged from the system, and to transfer it to the entering air. To keep pressure losses low, the velocity of air entering the evaporator is held to approximately 30 meters per minute. The air entry is through an opening approximately 1.2–1.5 m high extending the full width of the module. A bird screen or other low pressure drop device may be added over the opening if required.

Many types of contacting devices which will achieve good heat transfer between air and water are available. Standard chemical plant type packing such as Pall rings, Raschig rings, Intalox saddles and other free packing materials may be used. Low pressure drop preformed plastic shapes with many tortuous paths integrally molded into large block assemblies are also available for this task.

Biofouling is controlled by chlorination. Massive kill doses are applied for short periods to one module at a time (of the sixty which make-up the plant) so that the overall level in the plant effluent will always be within acceptable limits. Salting out, if it occurs, is washed out by circulating fresh water over the contact material at night or during scheduled maintenance.

Because of the low air velocities through the evaporative pad, salt water entrainment is negligible. Entrainment which does occur settles out over the 200 m air passage over the solar pond in the evaporator section. If too much salt carries over to the condenser, an extrainment separator located downstream of the condenser may be employed.

Evaporator Section-Solar Pond Enclosure

The enclosure for the solar pond consists of four basic components: (1) the housing or cover; (2) the support structure; (3) the absorptive surface or absorber and; (4) the first conduit for salt water of relatively warm temperature.

The cover has two basic functions. It must allow the energy required for evaporation (sunlight) to reach the feed water and must keep this energy available for the evaporative process. Keeping the energy available involves limiting reradiation, convection and conduction heat transfer and ambient air infiltration.

In addition to these basic functions, the cover must be an effective surface for nighttime condensation, must have the potential for 20-year life and must be easily cleaned and maintained.

Glass appears to best meet all these criteria. It has a transmissivity of approximately 85% in the visible and ultraviolet range and is virtually opaque to infrared reradiation. It is impervious to air and water and can be mounted with any number of leak-tight sealant-gasket combinations. Glass is an effective condensing surface, and can be treated to be an excellent surface. (A good condensing surface is conducive to liquid formation and runoff without droplet formation.) Glass is also very hard, abrasion resistant and durable with a life of well over 20 years barring catastrophic occurrences. Its hard, smooth surface is conductive to simple cleaning. Its availability and relatively low cost make replacement viable when failures do occur.

The most viable alternatives to glass are plastic film or sheet. Most of these materials have about the same transmissivity as glass in the visable and ultraviolet range but also have a high value of transmissivity for infrared radiation, thus allowing the pond heat to reradiate. Plastics, in general, are poor surfaces for condensation and must be treated for acceptable service. The most serious drawback for plastics is the low tolerance to heat and ultraviolet radiation. Generally, thickness must be increased to yield a durable surface. This increases weight, decreases transmissivity and increases cost.

The support structure for the cover must be strong enought to support the glazing under all types of weather conditions. It must accomplish this while keeping the size of the members to a minimum. This not only reduces the weight (i.e., cost), but also limits the interference of the structure with solar radiation needed by the pond water. The structure must be corrosion resistant to provide low maintenance and a 20-year life. It should also be easily and cheaply assembled and installed.

These criteria appear to be best met by a framework of fiberglass reinforced plastic structural members. This material is strong, lightweight, noncorrosive and cost competitive with metals having similar properties (i.e., aluminum, stainless steel).

The inventive apparatus and process as set forth in this embodiment employ a black absorber sheet approximately one-half inch below the surface of the pond water. The solar radiation absorber is a vital part of the desalination system. For the system to work well, the solar radiation must be converted to usable long-wave length energy (heat) and transferred to the feed water. This absorber must be durable in salt water and resistant to biofouling. Also, it should be inexpensive and easily replaced if damage or severe biofouling occur.

One absorber which fits these criteria is a semirigid plate of black polyethylene or polypropylene. The plate is simply supported by "legs" of the desired length. The plastic material is unaffected by temperatures in the plant operating range and is resistant to ultraviolet radiation damage when blackened as required. Using mass production fabrication techniques, large, strong absorber plates can be produced quickly and cheaply.

The final component of the solar pond is the first conduit for salt water of relatively moderate temperature. This is the reservoir for the feed water. It must be water tight, resistant to salt water attack and biofouling, and be easily cleaned. The base should also limit heat loss to the earth below and have a 20-year life.

The best alternative appears to be a concrete or packed earth base with a heavy plastic liner.

Condenser

The heat exchange means or condenser is a critical design element because of its potentially adverse impact on plant power consumption and the difficulty in controlling corrosion and biofouling. The latter problems are controlled by mechanical cleaning, careful selection of materials and chlorination.

Low pressure drop, i.e., low velocity, is necessary to keep power requirements low. But low velocities decrease the rate of heat transfer and allow some types of crustaceans to adhere to tube walls. Compromise between the cost of the heat exchangers and the cost of the power supply system is necessary.

The condenser configuration may be a conventional single pass straight tube design with water flow inside the tubes and air outside, finned tubes, or pressed frames and brazed sections. One or more condenser units may be employed.

Biofouling Control

Desalination systems are potentially quite vulnerable to reduced performance due to biofouling. There are two basic form of fouling of concern: Microbiofouling, the formation of a "slime" layer, on surfaces exposed to water; and macrobiofouling, the growth of larger marine organisms such as barnacles, mussels or hydroids. Microfouling is always a precursor to macrofouling. It is not always the case, however, that macrofouling will develop on all exposed surfaces. Where there is a continuous fluid flow through a system at rates above 1 meter per second, macrofouling organisms and their larvae do not attach surfaces. Thus, even though a wetted surface will develop a microfouling layer, fluid velocity can avert macrofouling growth. Usually, though, a system cannot be designed to assure a continuous minimum flow velocity everywhere. Maintenance shutdowns, for example, are necessary but will allow macrofoulers to attach and grow during subsequent operations.

The proposed system has several areas were fouling is of concern.

Intake screens. Two kinds of intake screens are employed: an outer velocity cap screen designed to prevent ingestion and entrainment of fish and similarly sized marine bicta; and an inner fine screen to capture smaller organisms (such as shrimp).

Velocity cap designs are intended to reduce water velocity and to direct intake flows along horizontal gradients. Fish are capable of resisting large horizontal velocities, but do not seem to be able to evade vertical velocity streams. In any case, velocity caps are susceptable to macrofouling.

The inner intake screens are finer in mesh size. A variety of designs are well developed for use in power plant service. Traveling screens of appropriate design are replaced and cleaned without interrupting flow. In addition, chlorine is injected into the intake system before flow reaches the inner screens. This reduces or even eliminates macrofouling of the screens.

Condenser tubing. Macrofouling will eventually plug condenser tubes, and must be prevented by strong measures. Microbiofouling layers, if unchecked, build up on condenser tubes, reducing effectiveness of heat transfer, and thus reducing plant efficiency. A combination of chlorine injection and mechanical cleaning with a system using circulating sponge rubber balls or brushes (using reverse flows to move brushes through the tubes) prevents macrofouling and controls microfouling to tolerable levels.

Solar heating pond. Given the operating temperatures reached in the pond, macrofouling organisms are in general killed, but microfouling bacteria may survive. Periodic antifouling measures include chlorination and/or periodic stopping of pond flow to allow the water temperature to build up to levels that will be lethal to microorganisms (e.g., 60° C.).

Finally, heavier doses of chlorine are required in some circumstances to purify the water and make it environmentally suitable for returning it to the sea.

Evaporative Pad: The heated water from beneath the solar pond passes through the matrix of the evaporative pad before being discharged. Biofouling is generally controlled upstream of this point.

Chlorination

Chlorination is necessary to prevent biofouling of the condenser heat exchanger internal tubing surfaces, to prevent algae and growth in the solar pond and product water pools and to assure a low bacterial count in the product water.

The quantity of chlorine required for treating seawater varies considerably with the water intake condition and normally ranges 1–10 ppm. However, this demand does not have to be met if chlorine is to act only as a deterrent. Very low sublethal doses of chlorine if injected continuously repel hard-shelled organisms and also inhibit microorganisms. A dose of 0.05 ppm is adequate for partial control, with higher concentrations injected periodicaly to produce a kill in selected areas. For a chlorine concentration of 0.05 ppm for the inventive apparatus and process, 10 kg of available chlorine per day is required for the seawater system. Less than 1 kg is sufficient for the product water pools.

Because power is at a premium, chlorine is purchased as concentrated sodium perchlorate solution rather than generated on site.

Four pump transfer and metering units are provided, two each for the seawater and potable water systems. One set in each system is a redundant standby to assure continuous operation during unanticipated daytime maintenance.

Chlorinator transfer and metering systems are well developed and reliable components are described in the literature.

Mechanical Tube Cleaning

To keep the heat transfer surfaces in the condenser free from fouling, in addition to chlorination, a mechanical cleaning system is provided. Separate mechanical cleaners are installed at each of the modules.

Both mechanical and chemical tube cleaning processes have been used to remove fouling from tube surfaces that come in contact with seawater. Of the mechanical systems available, Amertap is the system most easily adaptable to the instant process. Most of the equipment required for this operation is external to the heat exchangers. It consists of a ball storage tank, which may include counters and graders to detect ball wear; ball feed pumps and lines, collection screens to prevent the release of rubber balls into the water stream, and lines to return balls from the collection screens to the ball storage tanks.

The balls are randomly distributed to all the tubes in a given heat exchanger. In usual applications, the number of balls in circulation through a heat exchanger at any given time corresponds to about 10 percent of the number of tubes. This provides an average tube cleaning frequency of about once every 5 to 10 minutes. The number of balls in the system can be adjusted, within certain limits, to provide the desired cleaning frequency.

The power requirement for the Amertap recirculating pumps is less than 0.5 kW per module.

Fresh (Product) Water Storage

The product water storage consists of 60 modularized pools located below the condenser piping systems. Each pool has a capacity of 1000 cu m (ten days production), and is roughly 1.5 m deep by 40 m long by 16 m wide. The pools feed a common buried water header.

Solar Power Subsystem

Requirements for the solar power subsystem are:

Normal operating power must be derived from direct or indirect solar energy sources and must be sufficient for running all site auxiliary systems.

The system must be capable of normal restarts from the solar energy source or from stored energy obtained from a solar source.

A fossil fuel back-up power system can be provided for emergency conditions.

The energy delivery system and controls and control room equipment are designed along conventional lines.

The power system selected for the instant example of the inventive process is a solar cell collector system with battery storage and with DC/AC converters to operate motors, provide lighting and other site power uses.

It should be understood that the foregoing disclosure emphasizes certain specific embodiments of the invention and that all modifications or alternatives equivalent thereto are within the spirit or scope of the invention as set forth in the appended claims.

What is claimed is:

1. A process for the evaporative desalination of salt water to provide fresh water which process fully utilizes the latent heat of condensation to provide additional fresh water, comprising, during periods of isolation:
   (a) passing comparatively cold salt water into indirect heat exchange contact with a flow of moisture laden comparatively warm air so that fresh water is condensed from the moisture laden comparatively warm air and the heat of condensation of that fresh water is transferred to the comparatively cold salt water, the temperature of which becomes comparatively warm;
   (b) segregating at least parts of the flow of salt water of comparatively warm temperature into at least a first stream and a second stream;
   (c) directly contacting only the first stream of the salt water of comparatively warm temperature with the flow of moist air which is subsequently passed into indirect heat exchange contact with the comparatively cold salt water, while simultaneously passing the first stream over a solar absorption surface, and segregating from the atmosphere and heating by solar means both this first stream of salt water of comparatively warm temperature and the flow of moist air to predominantly cause evaporation of water into the air so that the air becomes moisture laden;
   (d) wetting an evaporative medium with at least a portion of the second stream of salt water of comparatively warm temperature;
   (e) passing ambient air through the wetted evaporative medium so that the air absorbs moisture and becomes the flow of moist air which is directly contacted with the first stream of salt water while both are heated by solar means; and
   (f) collecting at least the first stream of the salt water of comparatively warm temperature in a warm brine collection means;

and further comprising, during periods of reduced isolation:
   (g) utilizing the salt water of comparatively warm temperature collected in the warm brine collection means to produce additional fresh water by evaporative desalination.

2. The process of claim 1 in which the salt water is seawater.

3. The process of claim 1 in which the salt water is brackish water.

4. The process of claim 1 in which the ratio between the volume flow rate of the salt water in the first stream and the second stream is about 1:5.

5. The process of claim 1 in which operation is continuous.

6. The process of claim 1 in which the first stream and second stream are completely segregated from each other.

7. The process of claim 1 in which only parts of the first stream and second stream are intermittently segregated from each other.

8. The process of claim 1 in which all of the salt water of comparatively warm temperature is ultimately employed to wet the evaporative medium.

9. The process of claim 1 wherein the process is a modular sub-process within a system of like, repeating modular sub-processes.

10. The process of claim 1 in which the first stream of salt water of comparatively moderate temperature and the flow of moist air are directly contacted countercurrently.

11. The process of claim 1 in which the first stream of salt water comprises a thin film as it flows over the solar absorption surface.

12. The process of claim 1 wherein the collection of the salt water of comparatively warm temperature in a warm brine collection means and utilization of that water during periods of reduced insolation to produce additional fresh water by evaporative desalination includes:
  (i) maintaining a reservoir of water from the first stream of salt water of comparatively warm temperature;
  (ii) permitting water from the first stream of salt water of comparatively warm temperature to evaporate into a body of air to humidify the air;
  (iii) condensing fresh water from this humidified air; and
  (iv) collecting the fresh water so condensed.

13. The process of claim 1 wherein the utilization of the salt water of comparatively warm temperature collected in the warm brine collection means to produce additional fresh water by evaporative desalination during periods of reduced insolation comprises:
  (i) maintaining a reservoir of water from the first stream of salt water of comparatively warm temperature;
  (ii) wetting an evaporative medium with warm brine from the warm brine collection means;
  (iii) passing ambient air through the wetted evaporative medium so that the air absorbs moisture to become moist air;
  (iv) directly contacting this moist air with the reservoir of water from the first stream of salt water of comparatively warm temperature to further humidify the air;
  (v) condensing fresh water from this humidified air; and
  (vi) collecting the fresh water so condensed.

14. The process of claim 1 wherein the utilization of the salt water of comparatively warm temperature collected in the warm brine collection means to produce additional fresh water by evaporative desalination during periods of reduced insolation comprises:
  (i) wetting an evaporative medium with warm brine from the warm brine collection means;
  (ii) passing ambient air through the wetted evaporative medium so that the air absorbs moisture to become moist air;
  (iii) directly contacting warm brine from the warm brine collection means with the flow of moist air to further humidify the air; and
  (iv) passing comparatively cold salt water into heat exchange contact with the flow of humidified air so that fresh water is condensed from the humidified air and the heat of condensation of that fresh water is transferred to the comparatively cold salt water, the temperature of which becomes comparatively warm.

15. The process of claim 1 wherein the utilization of the salt water of comparatively warm temperature collected in the warm brine collection means to produce additional fresh water by evaporative desalination during periods of reduced insolation comprises:
  (i) wetting an evaporative medium with warm brine from the warm brine collection means;
  (ii) passing ambient air through the wetted evaporative medium so that the air absorbs moisture to become moist air;
  (iii) directly contacting warm brine from the warm brine collection means with the flow of moist air to further humidify the air;
  (iv) condensing fresh water from this humidified air; and
  (v) collecting the fresh water so condensed.

16. The process of claim 14 or 15 further comprising combining the salt water of comparatively warm temperature with the warm brine from the warm brine collection means and then directly contacting this combined flow with the moist air which is subsequently passed into heat exchange relationship with the comparatively cold salt water.

17. An apparatus for the evaporative desalination of salt water to provide fresh water which apparatus is designed to fully utilize the latent heat of condensation to provide additional fresh water, comprising:
  (a) heat exchange means having a liquid-receiving section with entrance and exit ports and a vapor-receiving section for passing cold salt water contained in the liquid receiving section into indirect heat exchange contact with a flow of moisture laden comparatively warm air contained in the vapor receiving section so that fresh water may be condensed from the moisture laden comparatively warm air and the heat of condensation of that fresh water transferred to the comparatively cold salt water, the temperature of which will become comparatively warm;
  (b) means, communicating with the exit port of the liquid-receiving section of the heat exchange means, for segregating at least parts of the flow of salt water of comparatively warm temperature into a least a first and second stream;
  (c) means, having air inlet and air outlet ports, for directly contacting only the first stream of the salt water of comparatively warm temperature with the flow of moist air which is subsequently passed into indirect heat exchange contact with the comparatively cold salt water and means for simultaneously segregating from the atmosphere and heating by solar means both the first stream of salt water of comparatively warm temperature and the flow of moist air, including a solar absorption surface in direct contact with the first stream of salt water, to predominantly cause evaporation of water into the air so that the air becomes moisture laden;
  (d) an evaporative medium positioned prior to the air inlet of the means for directly contacting the first stream of the salt water of comparatively warm temperature with the flow of moist air, so that ambient air may be passed through the evaporative medium to absorb moisture and become the flow of moist air which is directly contacted with the stream of salt water while both are heated by solar means;

(e) means for conveying at least a portion of the second stream of salt water of comparatively warm temperature into direct contact with the evaporative medium in order to wet the medium; and
(f) means for collecting and storing at least the first stream of salt water of comparatively warm temperature for utilization to produce additional fresh water by evaporative desalination during periods of reduced insolation.

18. The apparatus of claim 17 in which the means, communicating with the exit port of the liquid-receiving section of the heat exchange means, for at least partially segregating the flow of salt water of comparatively warm temperature into at least a first and second stream comprises at least two conduits.

19. The apparatus of claim 17 in which the means for simultaneously segregating from the atmosphere and heating by solar means both the salt water of comparatively warm temperature and the flow of moist air further comprises a solar collector housing.

20. The apparatus of claim 17 in which the solar absorbing surface also comprises the means for at least partially segregating the flow of salt water of comparatively warm temperature into at least a first and second stream.

21. The apparatus of claim 19 in which the solar collector housing is non-concentrating.

22. The apparatus of claim 17 in which the evaporative medium comprises an evaporative pad.

23. A process for the evaporative desalination of salt water, utilizing a platform floating on the surface of salt water, to provide fresh water which process fully utilizes the latent heat of condensation to provide additional fresh water, comprising, during periods of insolation:
(a) passing comparatively cold salt water into indirect heat exchange contact with a flow of moisture laden comparatively warm air so that fresh water is condensed from the moisture laden comparatively warm air and the heat of condensation of that fresh water is transferred to the comparatively cold salt water, the temperature of which becomes comparatively warm;
(b) segregating at least parts of the flow of salt water of comparatively warm temperature into at least a first stream and a second stream;
(c) directly contacting only the first stream of the salt water of comparatively warm temperature with a flow of moist air from the surface of the salt water which is subsequently passed into indirect heat exchange contact with the comparatively cold salt water, while simultaneously passing the first stream over a solar absorption surface, and segregating from the atmosphere and heating by solar means both this first stream of salt water of comparatively warm temperature and the flow of moist air to predominantly cause evaporation of water into the air so that the air becomes moisture laden; and
(d) collecting the second stream of salt water of comparatively warm temperature and any portion of the first stream of salt water of comparatively warm temperature which has not evaporated in a warm brine collection means beneath the floating platform;
and further comprising, during periods of reduced insolation:
(e) utilizing the salt water of comparatively warm temperature collected in the warm brine collection means to produce additional fresh water by evaporative desalination.

24. An apparatus for the evaporative desalination of salt water, utilizing a platform floating on the surface of the salt water, to provide fresh water which apparatus is designed to fully utilize the latent heat of condensation to provide additional fresh water, comprising
(a) a floating platform;
(b) heat exchange means, disposed on the floating platform, said heat exchange means having a liquid-receiving section with entrance and exit ports and a vapor-receiving section for passing cold salt water contained in the liquid receiving section into indirect heat exchange contact with a flow of moisture laden comparatively warm air contained in the vapor receiving section so that fresh water may be condensed from the moisture laden comparatively warm air and the heat of condensation of that fresh water transferred to the comparatively cold salt water, the temperature of which will become comparatively warm;
(c) means, affixed to the floating platform, communicating with the exit port of the liquid-receiving section of the heat exchange means, for segregating at least parts of the flow of salt water of comparatively warm temperature into at least a first and second stream;
(d) means, disposed on the floating platform, having air inlet and air outlet ports, for directly contacting only the first stream of the salt water of comparatively warm temperature with a flow of moist air from the surface of the salt water which is subsequently passed into indirect heat exchange contact with the comparatively cold salt water and means for simultaneously segregating from the atmosphere and heating by solar means both the first stream of salt water of comparatively warm temperature and the flow of moist air, including a solar absorption surface in direct contact with the first stream of salt water, to predominantly cause evaporation of water into the air so that the air becomes moisture laden; and
(e) means for collecting and storing beneath the floating platform the first and second streams of salt water of comparatively warm temperature for utilization to produce additional fresh water by evaporative desalination during periods of reduced insolation.

25. The apparatus of claim 19 in which the solar collector housing is concentrating.

26. The apparatus of claim 19 wherein the solar collector housing further comprises at least one longitudinal drain vertically positioned between the housing and the solar absorption surface, and communicating at one end with fresh water collection means, so that fresh water which condenses on the housing during periods of reduced insolation may be collected.

27. The apparatus of claim 26 further comprising means for recycling water from the means for collecting and storing salt water of comparatively warm temperature over the evaporative medium for utilization to produce additional fresh water by evaporative desalination during periods of reduced insolation.

28. The apparatus of claim 27 further comprising means for recycling water from the means for collecting and storing salt water of comparatively warm temperature over the solar absorption surface for utilization to produce additional fresh water by evaporative desalination during periods of reduced insolation.

29. The apparatus of claim 17 wherein the means for at least partially segregating the first and second streams of salt water entirely segregates them.

30. The apparatus of claim 17 wherein the apparatus is a modular sub-apparatus within a system of like, repeating modular sub-apparatuses.

* * * * *